United States Patent
Ichikawa et al.

(10) Patent No.: US 9,967,835 B2
(45) Date of Patent: May 8, 2018

(54) INFORMATION PROCESSING SYSTEM, INFORMATION PROCESSING DEVICE AND INFORMATION PROCESSING METHOD

(71) Applicant: FUJITSU LIMITED, Kawasaki-shi, Kanagawa (JP)

(72) Inventors: Shizuko Ichikawa, Atsugi (JP); Hisatoshi Yamaoka, Kawasaki (JP); Takashi Imai, Atsugi (JP); Miwa Okabayashi, Sagamihara (JP); Tatsuro Matsumoto, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days. days.

(21) Appl. No.: 15/432,519

(22) Filed: Feb. 14, 2017

(65) Prior Publication Data
US 2017/0289927 A1    Oct. 5, 2017

(30) Foreign Application Priority Data
Mar. 29, 2016    (JP) ................. 2016-066821

(51) Int. Cl.
*H04W 52/36* (2009.01)
*H04W 52/32* (2009.01)

(52) U.S. Cl.
CPC ......... *H04W 52/36* (2013.01); *H04W 52/322* (2013.01)

(58) Field of Classification Search
CPC .......................... H04W 52/36; B60W 2422/95
USPC ... 455/550.1, 556.1, 456.1, 456.6, 453, 446, 455/517, 556.2
See application file for complete search history.

(56) References Cited

U.S. PATENT DOCUMENTS

| 4,905,190 A | * | 2/1990 | Yokoyama | G06F 9/462 718/108 |
| 9,738,125 B1 | * | 8/2017 | Brickley | B60D 1/26 |
| 2011/0255742 A1 | * | 10/2011 | Horie | A63F 13/42 382/103 |
| 2017/0109105 A1 | * | 4/2017 | Ueda | G06F 3/1221 |

FOREIGN PATENT DOCUMENTS

| JP | 2003-060655 | 2/2003 |
| JP | 2006-340168 | 12/2006 |
| JP | 2011-070596 | 4/2011 |

* cited by examiner

*Primary Examiner* — John J Lee
(74) *Attorney, Agent, or Firm* — Fujitsu Patent Center

(57) ABSTRACT

An information processing system includes a GW and a portable communication device. The GW includes a transmitter that transmits, to the portable communication device that is located within a given area, a request to transmit information; a receiver that receives a response to the request to transmit information from the portable communication device; and a data acquisition controller that, when the number of responses received is larger than a maximum allowable number to the GW, adjusts the area to which the request to transmit information is transmitted such that the number of responses is equal to or smaller than the maximum allowable number and that, when the number of responses is equal to or smaller than the maximum allowable number to the GW, adjusts an area to which the request to transmit information is transmitted, which is an area different from the area to which the request has been transmitted.

7 Claims, 17 Drawing Sheets

FIG.3

```
TRANSMISSION
REQUEST ID: 2
```

FIG.4

| CHRONOLOGICAL DATA | DEVICE ID |
|---|---|

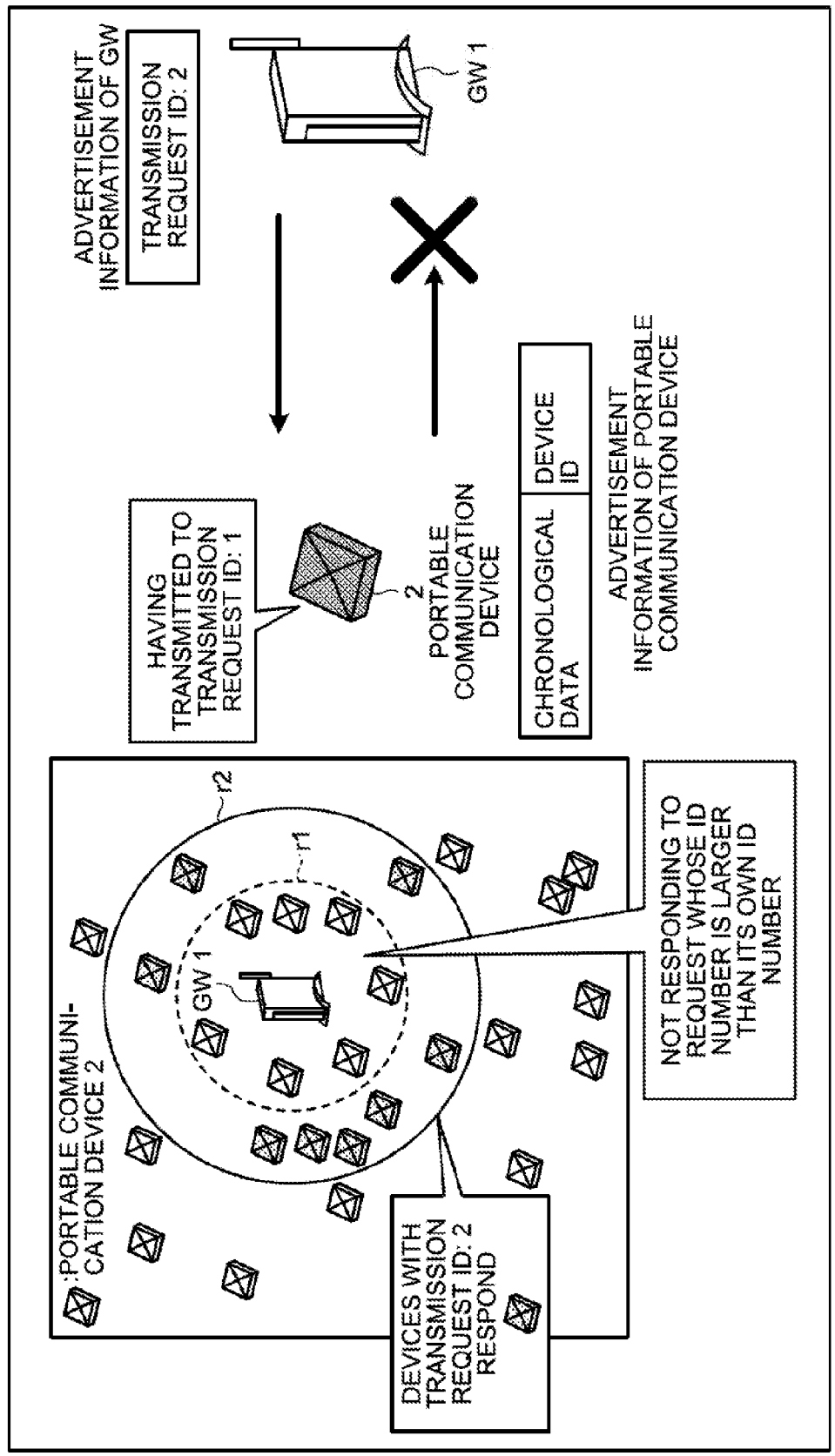

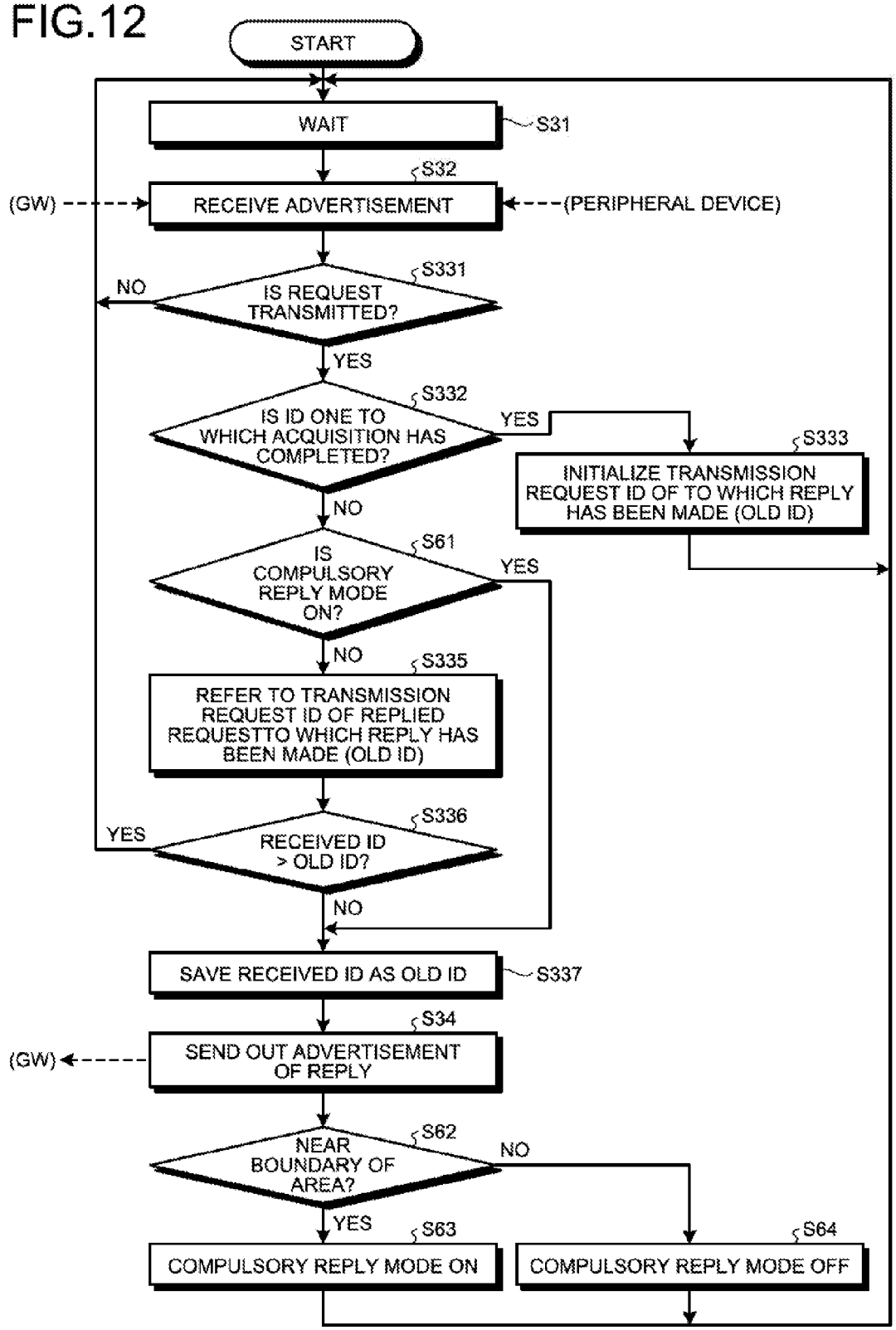

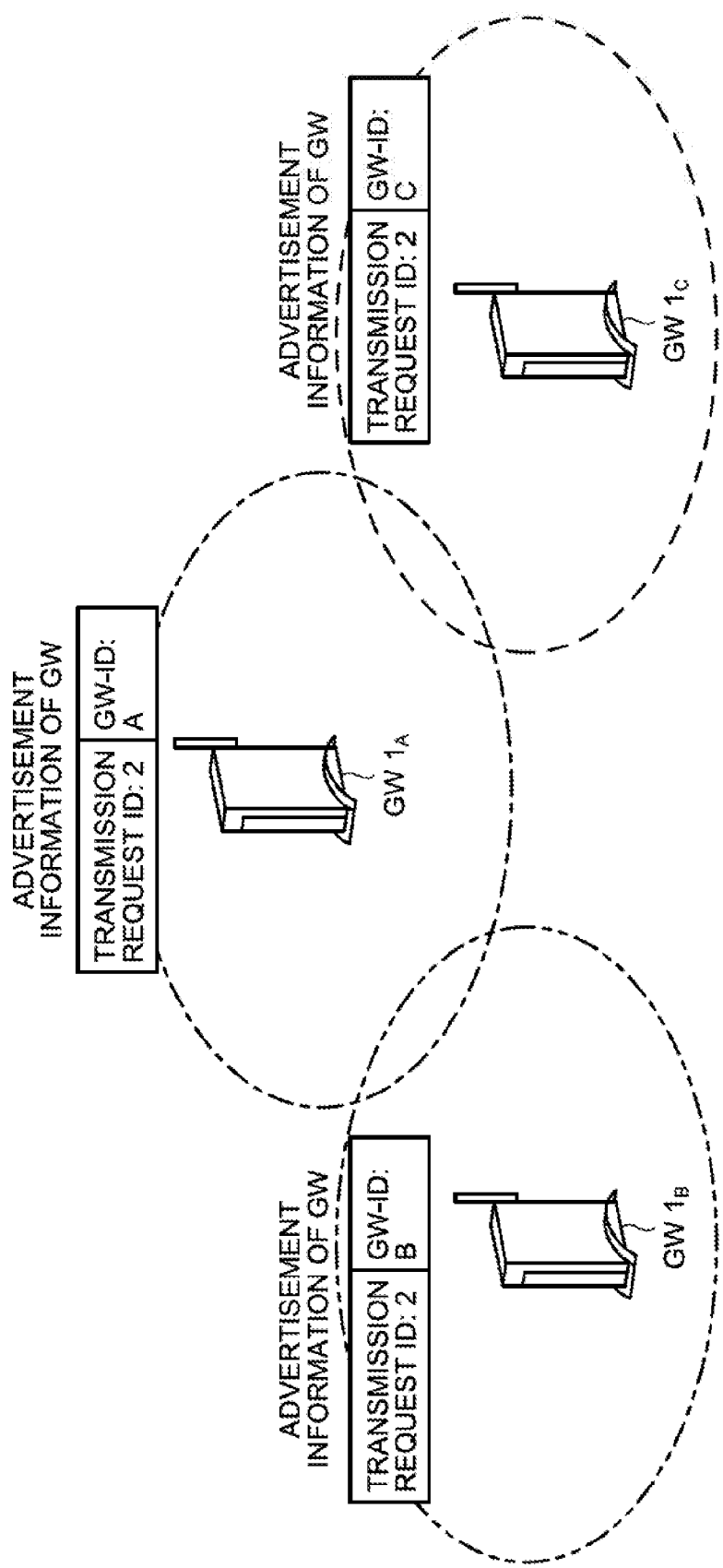

CONCENTRIC

WITH DIRECTIONALITY

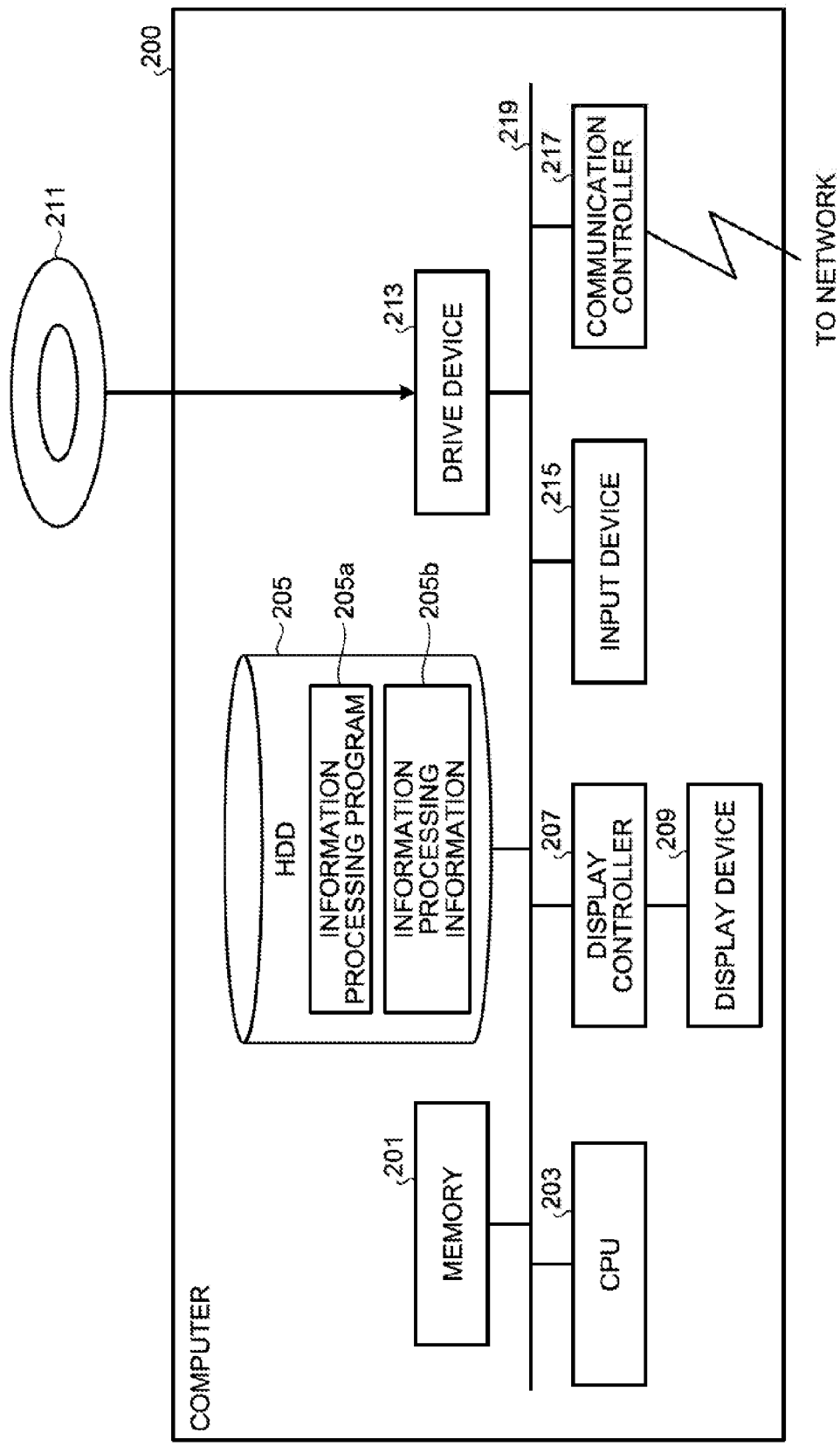

INFORMATION PROCESSING SYSTEM, INFORMATION PROCESSING DEVICE AND INFORMATION PROCESSING METHOD

CROSS-REFERENCE TO RELATED APPLICATION(S)

This application is based upon and claims the benefit of priority of the prior Japanese Patent Application No. 2016-066821, filed on Mar. 29, 2016, the entire contents of which are incorporated herein by reference.

FIELD

The embodiments discussed herein are related to an information processing system etc.

BACKGROUND

In recent years, systems that acquire data in an environment where unspecified and many users carry communication devices that sequentially transmit chronological data, such as sensor information, and each of the users moves around have been reviewed.

For example, a technology for an information acquisition apparatus that acquires information from many information sending-out devices is known (for example, see Japanese Laid-open Patent Publication No. 2006-340168 and Japanese Laid-open Patent Publication No. 2011-70596). In the technology, on receiving identifying information that is sent out from an information sending-out device, an information acquisition apparatus registers in advance the received identifying information as a subject from which information is acquired. The information acquisition apparatus sequentially transmits sent-out information transmission requests to information sending-out devices sequentially according to the sets of identifying information that are registered as subjects from which information is acquired and acquires sets of sent-out information that are transmitted from the information sending-out devices.

There is another disclosed technology for a distribution measuring apparatus that acquires data in a way that the distribution measuring apparatus transmits a detection condition by radio to multiple sensors and receives response signals by radio from sensors that meet the transmitted detection condition (see, for example, Japanese Laid-open Patent Publication No. 2003-60655).

There is however a problem in that, when there are unspecified and many communication devices, the information processing device is not able to acquire an excess of sets of data of communication devices over the maximum allowable number of sets of data to be received.

For example, the conventional information acquisition apparatus sequentially transmits requests to transmit sent-out information according to sets of identifying information that are registered in advance as subjects from which information is acquired and then acquires sets of sent-out information that are transmitted from information sending-out devices. When there are unspecified and many information sending-out devices whose identifying information is unknown, however, the information acquisition apparatus is not able to acquire sets of data of the information sending-out devices in the first place.

Furthermore, for example, the distribution measuring apparatus of the conventional technology acquires data by receiving response signals from the sensors that meet the detection condition. When there are an excess of sensors that meet the detection condition over the maximum allowable number of sets of data to be received by the distribution measuring device, however, the distribution measuring apparatus is not able to acquire the excess of sets of data over the allowable number.

SUMMARY

According to an aspect of an embodiment, an information processing system includes unspecified and many communication devices and an information processing device that acquires sets of information of the respective unspecified and many communication devices. The information processing device includes a transmitter that transmits, to the communication device that is located within a given area, a request to transmit information. The information processing device includes a receiver that receives a response to the request to transmit information from the communication device that is located within the given area. The information processing device includes an adjuster that, when the number of responses that are received by the receiver is larger than a maximum allowable number to the information processing device, adjusts the area to which the request to transmit information is transmitted such that the number of responses is equal to or smaller than the maximum allowable number and that, when the number of responses is equal to or smaller than the maximum allowable number to the information processing device, adjusts an area to which the request to transmit information is transmitted, which is an area different from the area to which the request has been transmitted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram of an exemplary data structure of advertisement information of a GW;

FIG. 4 is a diagram of an exemplary data structure of advertisement information of a portable communication device;

FIG. 5B is Diagram (2) illustrating the exemplary advertisement transmission process performed by the GW according to the first embodiment;

FIG. 12 is a diagram of an exemplary flowchart containing the advertisement transmission control process performed by a portable communication device according to the second embodiment;

FIG. 13 is a diagram of an exemplary case where there are multiple GWs;

FIG. 15 is a diagram of an exemplary computer that executes an information processing program.

DESCRIPTION OF EMBODIMENT(S)

Preferred embodiments of the present invention will be explained with reference to accompanying drawings. Note that the embodiments do not limit the invention.

[a] First Embodiment

Configuration of Information Processing System According to First Embodiment

Figure 1:
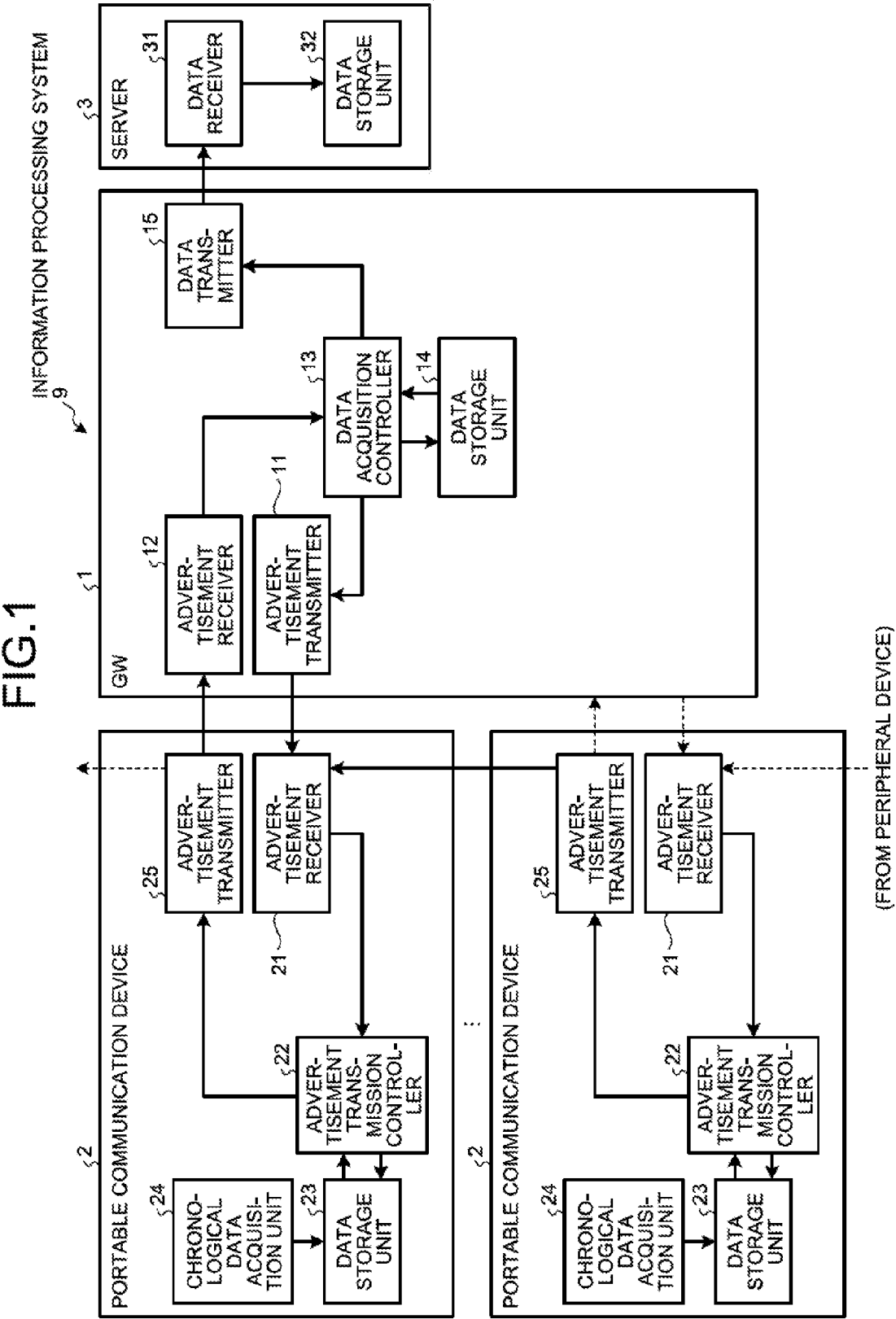
FIG. 1 is a block diagram of a functional configuration of an information processing system according to a first embodiment.

FIG. 1 is a block diagram of a functional configuration of an information processing system according to the first embodiment. As illustrated in FIG. 1, an information processing system 9 includes a gateway (GW) 1, multiple portable communication devices 2 and a server 3. The GW 1 is a communication device that relays data. The GW 1 communicates with a large number of portable communication devices 2 without specifying addresses with each other. The portable communication device 2 communicates with other communication devices 2 without specifying addresses with each other. Communicating with unspecified and many devices without specifying addresses as described above are referred to as "advertisement". The GW 1 according to the first embodiment sends out a request to transmit data (data transmission request) to unspecified and many portable communication devices 2 and receives responses to the sent-out request from the portable communication devices 2. When the number of responses is larger than a maximum allowable number to the GW 1, the GW 1 adjusts the area to which the GW 1 transmits the data transmission request (data transmission request area) such that the number of responses is equal to or smaller than the maximum allowable number. When the number of responses is equal to or smaller than the maximum allowable number to the GW 1, the GW 1 adjusts an area to which the data transmission request is transmitted, which is an area different from the area to which the data transmission request has been transmitted. In short, the GW 1 adjusts the transmission request area so as to receive the maximum allowable number of sets of data of the portable communication devices 2 or larger.

The server 3 stores chronological sets of data of the respective portable communication devices 2 that are acquired by the GW 1.

Figure 2:
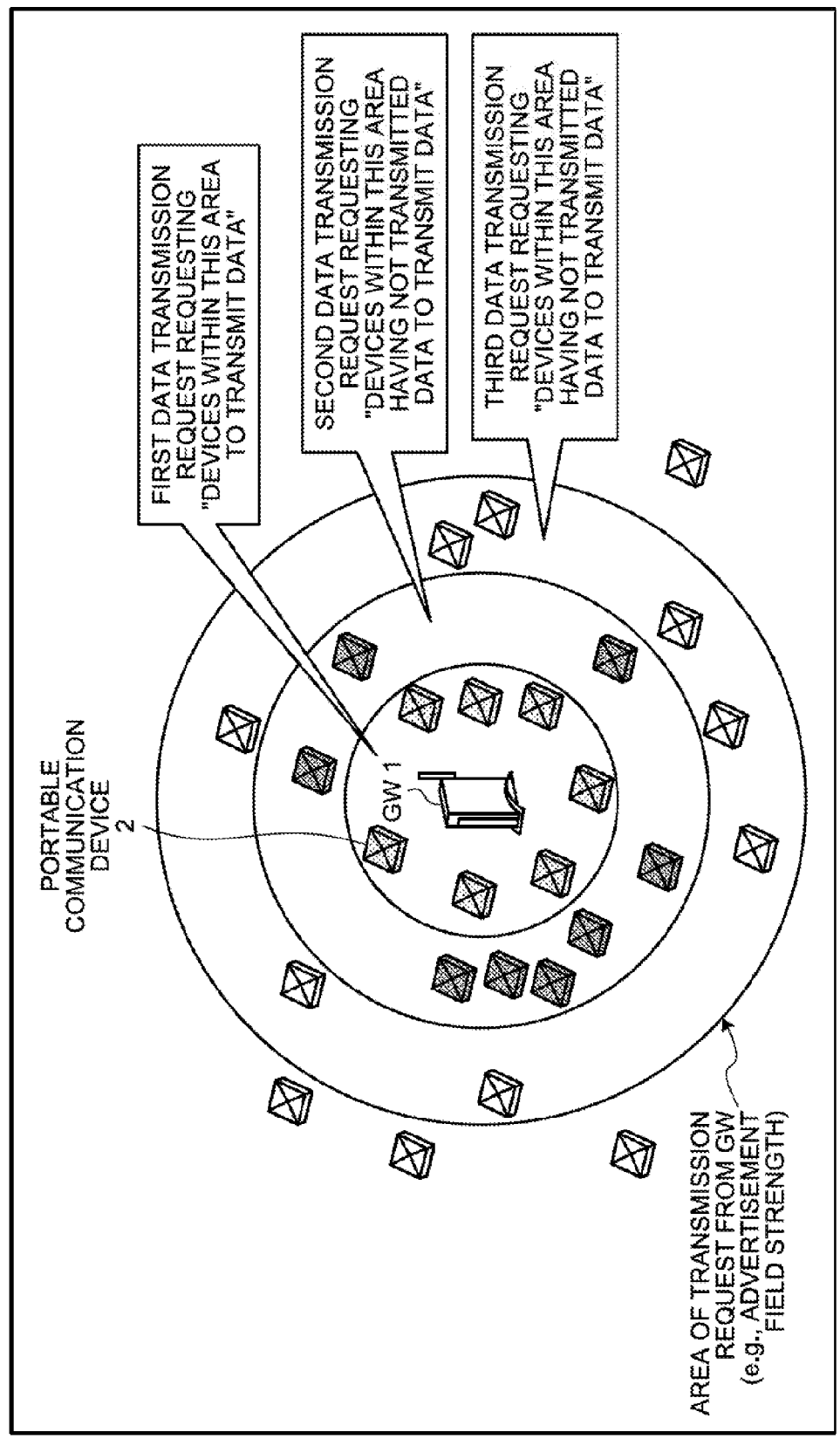
FIG. 2 is a diagram illustrating information processing according to the first embodiment.

With reference to FIG. 2, information processing according to the first embodiment will be described. FIG. 2 is a diagram illustrating information processing according to the first embodiment. As illustrated in FIG. 2, the GW 1 adjusts the transmission request area such that the number of responses to the transmission request is equal to or smaller than the maximum allowable number to the GW 1 and then transmits the data transmission request to unspecified and many portable communication devices 2. In other words, the GW 1 issues the data transmission request to the portable communication devices 2 having not transmitted data yet, among unspecified and many portable communication devices 2, within the transmission request area. The GW 1 transmits the data transmission request for the first time to a first area. The data transmission request refers to, for example, a transmission request requesting "the users of the devices within the area to transmit data". The GW 1 transmits the data transmission request for the second time to a second area covering the first area. In other words, the GW 1 issues the data transmission request for the second time to the portable communication devices 2 having not transmitted data yet, among unspecified and many portable communication devices 2, within the transmission request area. This data transmission request refers to, for example, a transmission request requesting "the users of the devices having not transmitted data within the area to transmit data". The GW 1 transmits the data transmission requests for the third time to a third area covering the second area. In other words, the GW 1 issues the data transmission request for the third time to the portable communication devices 2 having not transmitted data yet, among unspecified and many portable communication devices 2, within the transmission request area. This data transmission request refers to, for example, a transmission request requesting "the users of the devices not having transmitted data within the transmission request area". The area to which the GW 1 issues requests is adjusted, for example, by adjusting the advertisement field strength. Accordingly, even when there are unspecified and many portable communication devices 2, the GW 1 is able to acquire an excess of sets of data of the portable communication devices 2 over the maximum allowable number of sets of data to be received.

FIG. 1 will be referred back here. The GW 1 includes an advertisement transmitter 11, an advertisement receiver 12, a data acquisition controller 13, a data storage unit 14, and a data transmitter 15. The advertisement transmitter 11 is an exemplary transmitter. The advertisement receiver 12 is an exemplary receiver. The data acquisition controller 13 is an exemplary adjuster.

The advertisement transmitter 11 transmits multiple advertisements of the data transmission request to the portable communication devices 2 located within a given area. The advertisement transmitter 11 sends out advertisements of the data transmission request to the area that is limited by the data acquisition controller 13 to be described below. The limited area is represented, for example, by using the field strength of the sent-off.

Advertisement information of the advertisement that is sent out by the advertisement transmitter 11 will be described with reference to FIG. 3. FIG. 3 is a diagram of an exemplary data structure of the advertisement information of the GW. As represented in FIG. 3, the advertisement information of the GW 1 contains a transmission request identifier (ID). The transmission request ID is an ID corresponding to the transmission request area. For example, the initial value of the transmission request ID is 1 and the value is incremented every time the transmission request area is extended. Here, a transmission request ID "2" obtained by adding 1 to the previous transmission request ID is set as the result of an extension of the area from the transmission request whose initial value is 1 and of an increment of the value.

FIG. 1 will be referred back here. The advertisement receiver 12 receives advertisements of responses to the data transmission request from the multiple portable communication devices 2. The advertisement receiver 12 outputs the sets of received advertisement information of the portable communication devices 2 to the data acquisition controller 13.

The advertisement information on the advertisement that is sent out by the portable communication device 2 will be described with reference to FIG. 4. FIG. 4 is a diagram of an exemplary data structure of advertisement information of the portable communication device. As illustrated in FIG. 4, the advertisement information of the portable communication device 2 contains chronological data and a device ID. The chronological data is, for example, the latest data. The data is, for example, data of a temperature sensor or data of an acceleration sensor. It is satisfactory if the data is chronological data that is measured by the portable communication device 2. The device ID is an identifier that identifies the portable communication device 2.

FIG. 1 will be referred back here. The data acquisition controller 13 controls acquisition of data of the unspecified and many portable communication devices 2.

For example, when the number of responses is larger than a maximum allowable number to the GW 1, the data acquisition controller 13 adjusts the data transmission request area such that the number of responses is equal to or smaller than the maximum allowable number. For example, the data acquisition controller 13 determines whether the number of responses is larger than a predetermined threshold. The threshold refers to the number of responses that allow stable scanning of the portable communication devices 2. Upon determining that the number of responses is larger than the threshold, the data acquisition controller 13 narrows the data transmission request area and then requests the advertisement transmitter 11 to transmit the data transmission request again. In other words, the data acquisition controller 13 outputs the same ID as that previous transmission request ID to the advertisement transmitter 11 and requests the advertisement transmitter 11 to re-transmit the data transmission request.

When the number of responses is equal to or smaller than the threshold, the data acquisition controller 13 extends the data transmission request area and increments the transmission request ID. The data acquisition controller 13 then requests the advertisement transmitter 11 for the transmission. In other words, the data acquisition controller 13 outputs the ID obtained by adding 1 to the previous transmission request ID to the advertisement transmitter 11 and requests the advertisement transmitter 11 to transmit a data transmission request.

When the limit of the data transmission request area is reached, the data acquisition controller 13 requests the advertisement transmitter 11 to issue a notification indicating that the communication history is to be initialized (reset). After the resetting transmission is performed, the data acquisition controller 13 re-adjusts the data transmission request area to the narrowest area.

On receiving the sets of advertisement information of the portable communication devices 2 form the advertisement receiver 12, the data acquisition controller 13 stores the received sets of advertisement information in the data storage unit 14. The data acquisition controller 13 regularly or irregularly collects the sets of advertisement information stored in the data storage unit 14 and outputs the collected advertisement information to the data transmitter 15.

The data storage unit 14 stores data of each of the portable communication devices 2. The data storage unit 14 corresponds to a storage device that is, for example, a non-volatile semiconductor memory device, such as a flash memory or a ferroelectric random access memory (FRAM(trademark)).

The data transmitter 15 transmits, to the server 3, the sets of advertisement information that are output from the data acquisition controller 13.

The portable communication device 2 includes an advertisement receiver 21, an advertisement transmission controller 22, a data storage unit 23, a chronological data acquisition unit 24, and an advertisement transmitter 25.

The advertisement receiver 21 receivers the advertisement of the data transmission request from the GW 1. In other words, the advertisement receiver 21 receives advertisement information containing a transmission request ID from the GW 1. The advertisement receiver 21 receivers, in addition to the advertisement information from the GW 1, device information from communication devices, such as other portable communication devices 2, because advertisement refers to communications with unspecified and many communication devices whose addresses are unknown.

The advertisement transmission controller 22 determines whether to respond to the data transmission request. For example, the advertisement transmission controller 22 determines whether the transmission request ID contained in the advertisement information received by the advertisement receiver 21 is larger than the transmission request ID to which a response has been made. The transmission request ID to which a response has been made is stored by the advertisement transmission controller 22 in the data storage unit 23 to be described below. On determining that the transmission request ID contained in the advertisement information is larger than the transmission request ID to which a response has been made, the advertisement transmission controller 22 determines not to respond to the request because the portable communication device 2 has already made a response. When the transmission request ID contained in the advertisement information is the same as the transmission request ID to which a response has been made, the advertisement transmission controller 22 determines that this is a re-transmission of the data transmission request from the GW 1 and determines to respond to the request.

On determining to respond to the request, the advertisement transmission controller 22 stores, in the data storage unit 23, the transmission request ID contained in the advertisement information. The transmission request ID serves as the transmission request ID to which a response has been made. The transmission request ID to which a response has been made will be referred to as an "old ID" below. The advertisement transmission controller 22 outputs the current chronological data and the device ID of the portable communication device 2 that are stored in the data storage unit 23 to the advertisement transmitter 25 and requests the advertisement transmitter 25 to advertise the response.

When the advertisement receiver 21 receives the notification indicating that the communication history is to be initialized (reset), the advertisement transmission controller 22 initializes the old ID that is stored in the data storage unit 23. The old ID that is initialized is, for example, 999999; however, the old ID is not limited to this. It is satisfactory if the old ID is a value larger than the value used as the transmission request ID.

The data storage unit 23 stores the device ID of the portable communication device 2 and the old ID. The data storage unit 23 corresponds to a storage device that is, for example, a non-volatile semiconductor memory device, such as a flash memory or a ferroelectric random access memory (FRAM(trademark)).

The chronological data acquisition unit 24 acquires data from the sensor that is mounted on the portable communication device 2 over time. The chronological data can be acquired from not only the sensor incorporated in the portable communication device 2 but also a sensor that is externally connected temporarily. The chronological data acquisition unit 24 stores the acquired data in the data storage unit 23.

The advertisement transmitter 25 transmits an advertisement of a response to the data transmission request. The advertisement information to be transmitted contains the chronological data and the device ID of the portable communication device 2. The chronological data and the device ID are output by the advertisement transmission controller 22.

The server 3 includes a data receiver 31 and a data storage unit 32.

The data receiver 31 stores the advertisement information that is transmitted from the GW 1 in the data storage unit 32.

The data storage unit 32 stores chronological data of each of the portable communication devices 2. The data storage unit 32 corresponds to a storage device that is, for example, a non-volatile semiconductor memory device, such as a flash memory or a ferroelectric random access memory (FRAM (trademark)).

Exemplary Advertisement Transmission Process Performed by GW

Figure 5A:
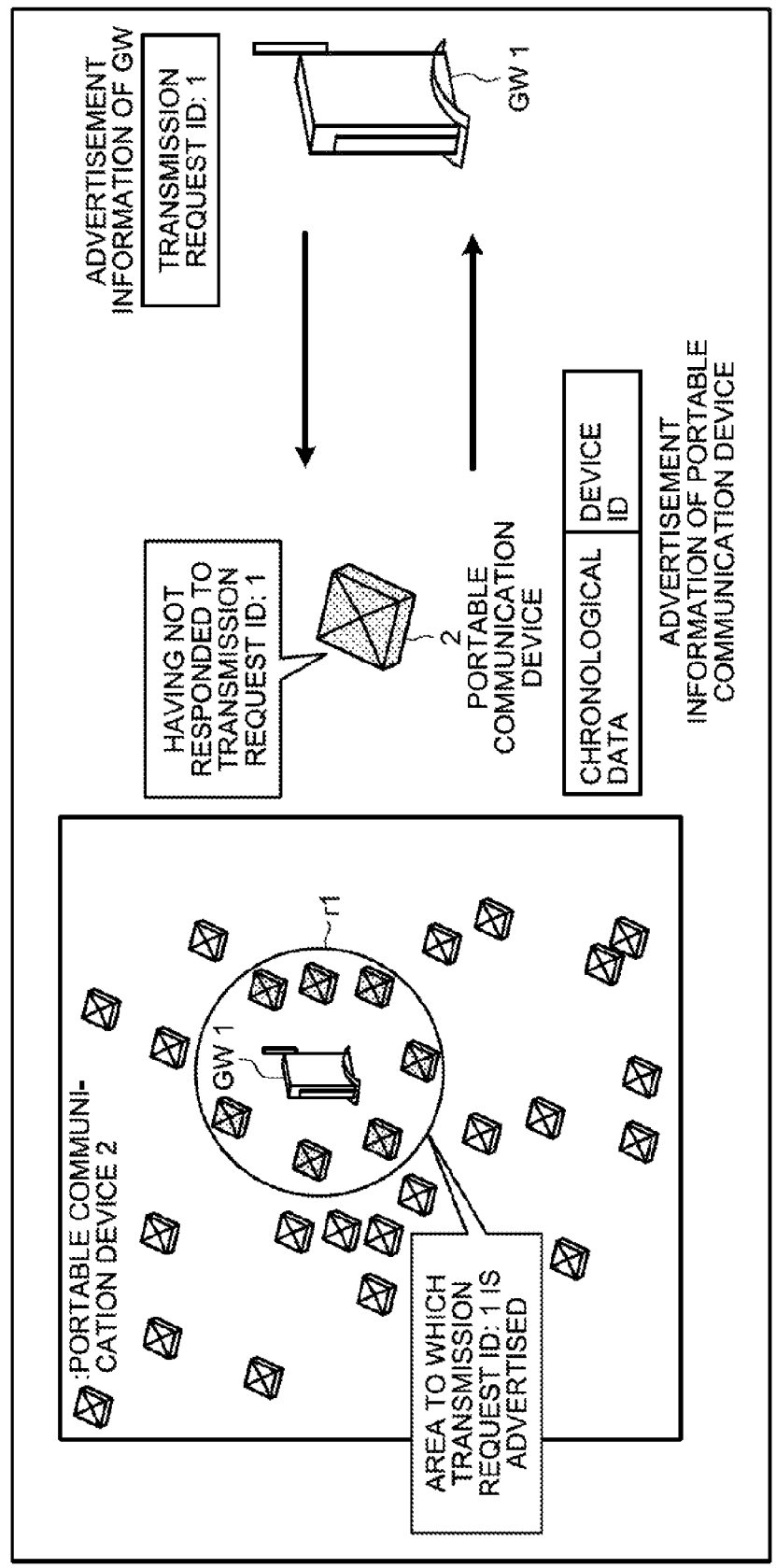
FIG. 5A is Diagram (1) illustrating an exemplary advertisement transmission process performed by the GW according to the first embodiment.

An exemplary advertisement transmission process performed by the GW 1 will be described here with reference to FIGS. 5A and 5B. FIGS. 5A and 5B are diagrams illustrating the exemplary advertisement transmission process performed by the GW. FIG. 5A illustrates the mode where the communication histories of all the portable communication devices 2 are reset.

As illustrated in FIG. 5A, in order to advertise a transmission request, the advertisement transmitter 11 of the GW 1 sets a sending-out field strength corresponding to a transmission request area r1 that is requested by the data acquisition controller 13. The advertisement transmitter 11 then transmits advertisements of the data transmission request to the portable communication devices 2. The data transmission request contains advertisement information where the transmission request ID is "1".

The advertisement receiver 21 of each of the portable communication devices 2 located within the area r1 receives the advertisement of the data transmission request from the GW 1. The advertisement transmission controller 22 determines whether the transmission request ID contained in the advertisement information is larger than the old ID. The portable communication device 2 has not responded to the data transmission request and thus the advertisement transmission controller 22 determines respond to the request. The advertisement transmission controller 22 then stores, in the data storage unit 23, the transmission request ID "1" contained in the advertisement information. The advertisement transmitter 25 then transmits an advertisement of a response to the GW 1. The advertisement information to be transmitted contains the chronological data and the device ID of the portable communication device 2.

In the GW 1, the advertisement receiver 12 receives the advertisement of the response to the data transmission request. The data acquisition controller 13 determines that the number of responses having received by the advertisement receiver 12 is equal to or smaller than the threshold.

Then, as illustrated in FIG. 5B, the data acquisition controller 13 of the GW 1 then extends the data transmission request area and increments the transmission request ID. The data acquisition controller 13 then sets a sending-out field strength for advertising the transmission request to an area r2 and notifies the advertisement transmitter 11 of the field strength. In order to advertise a transmission request, the advertisement transmitter 11 sets the sending-out field strength corresponding to the transmission request area r2 that is requested by the data acquisition controller 13. The advertisement transmitter 11 then transmits advertisements of the data transmission request to the portable communication devices 2. The data transmission request contains the advertisement information where the transmission request ID is "2".

Then, in each of the portable communication devices 2 located within the area r2, the advertisement receiver 21 receives the advertisement of the data transmission request from the GW 1. The advertisement transmission controller 22 determines whether the transmission request ID contained in the advertisement information is larger than the old ID. The advertisement transmission controller 22 of the portable communication device 2 determines that the transmission request ID "2" contained in the advertisement information is larger than the old ID "1" and thus determines not to respond to the transmission request. Accordingly, the advertisement transmitter 25 does not transmit any advertisement of response to the GW 1.

On the other hand, in the portable communication device 2 within the area r2 but outside the area r1, the portable communication device has never responded to the data transmission request and thus the advertisement transmission controller 22 determines to respond to the data transmission request. The advertisement transmission controller 22 then stores, in the data storage unit 23, the transmission request ID "2" contained in the advertisement information. The advertisement transmitter 25 transmits an advertisement of a response to the GW 1. The advertisement information to be transmitted contains the chronological data and the device ID of the portable communication device 2.

Exemplary Data Acquisition Control Process

Figure 6A:
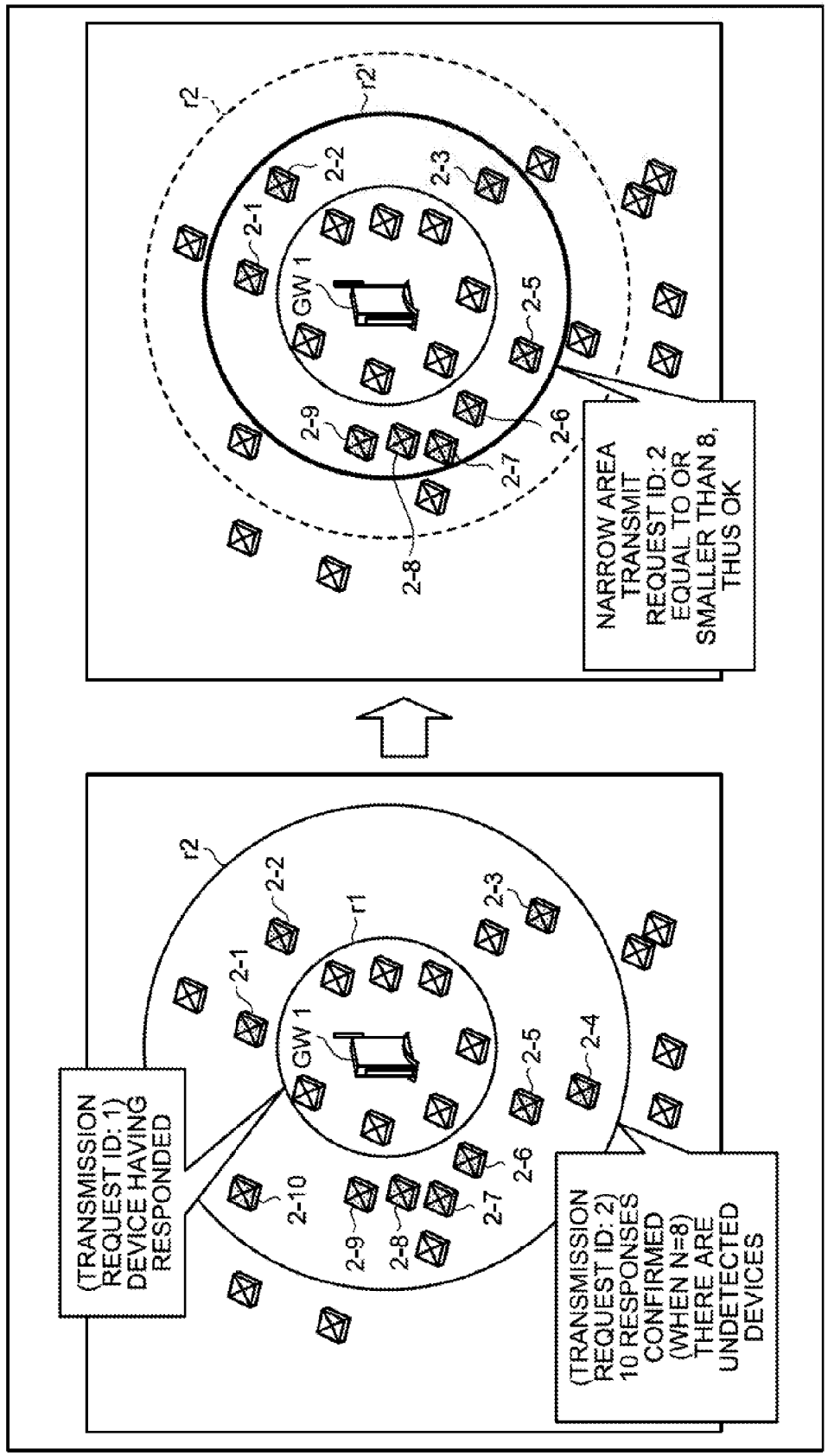
FIG. 6A is Diagram (1) illustrating an exemplary data acquisition control process performed by the GW according to the first embodiment.
Figure 6B:
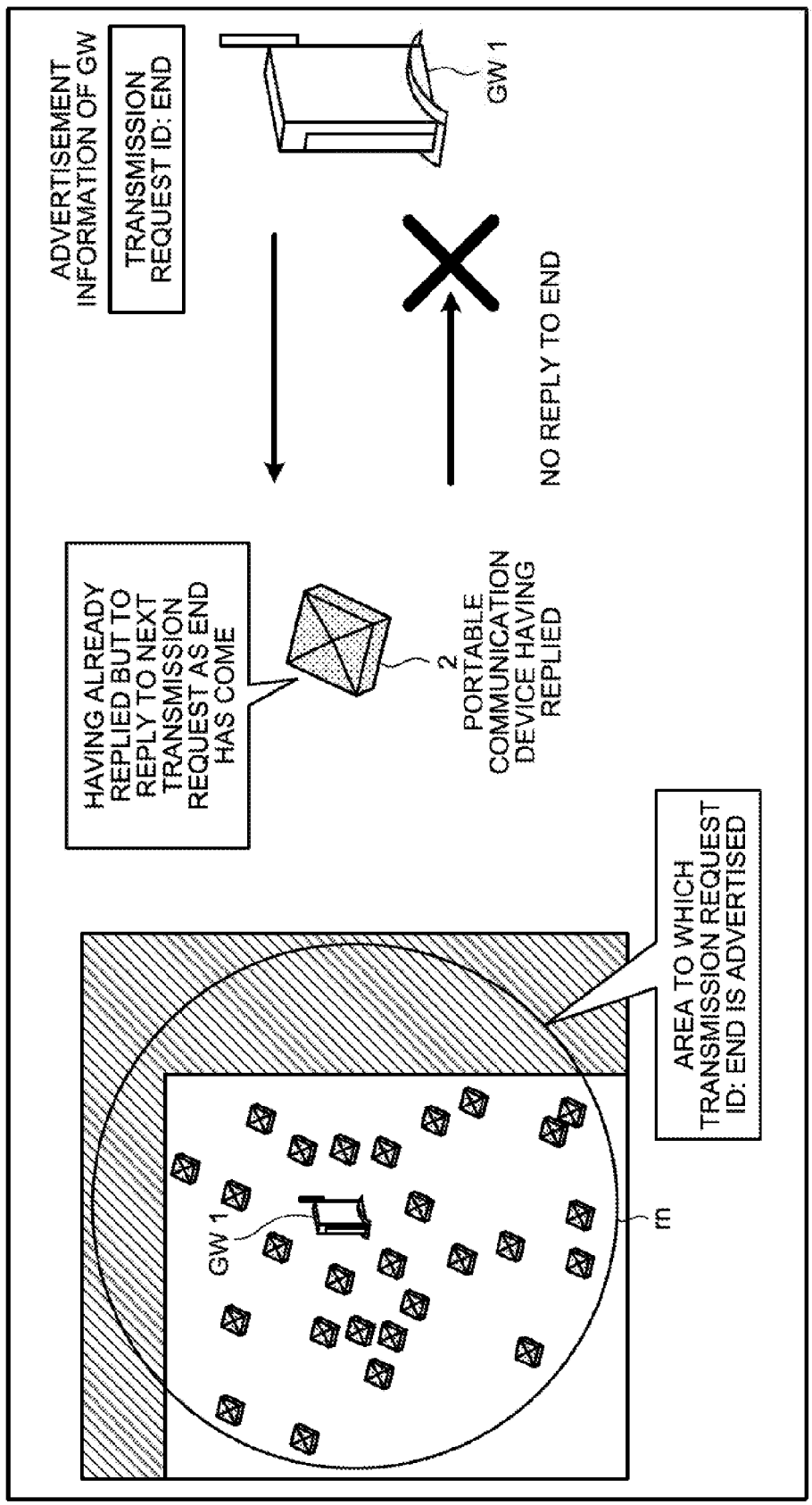
FIG. 6B is Diagram (2) illustrating the exemplary data acquisition control process performed by the GW according to the first embodiment.

An exemplary data acquisition process performed by the GW 1 will be described with reference to FIGS. 6A and 6B. FIGS. 6A and 6B are diagrams of the exemplary data acquisition process performed by the GW according to the first embodiment. According to FIG. 6A, the portable communication devices 2 within the area r1 respond to advertisements of the transmission request whose transmission request ID is "1". Furthermore, the ten portable communication devices 2-1 to 2-10 within the area r2 respond to advertisements of the transmission request whose transmission request ID is "2".

In the GW 1, the advertisement receiver 12 receives advertisements of responses to the data transmission request. The data acquisition controller 13 determines whether the number of responses received by the advertisement receiver 12 is larger than a threshold N that is 8. The data acquisition controller 13 determines that the number of responses (10) is larger than the threshold (8). In short, the data acquisition controller 13 determines that the maximum allowable number is exceeded. The data acquisition controller 13 then narrows the data transmission request area and requests the advertisement transmitter 11 to re-transmit the data transmission request.

The advertisement transmitter 11 sets, as a sending-out field strength of advertisements of the transmission request, a sending-out field strength that corresponds to an area r2' narrower than the transmission request area r2 and that is requested by the data acquisition controller 13. The advertisement transmitter 11 then transmits advertisements of the data transmission request to the portable communication devices 2. The data transmission request contains advertisement information where the transmission request ID is "2" that is the same as the previous transmission request ID.

In the eight portable communication devices 2-1 to 2-3 and 2-5 to 2-9 located in the area r2', the advertisement receiver 21 receives the advertisement of the data transmission request from the GW 1. The advertisement transmission controller 22 determines whether the transmission request ID contained in the advertisement information is larger than the old ID. The transmission request ID "2" contained in the advertisement information is not larger than the old ID "2" and thus the advertisement transmission controller 22 determines to respond to the request. The advertisement transmission controller 22 stores, in the data storage unit 23, the transmission request ID "2" that is contained in the advertisement information. The advertisement transmitter 25 transmits an advertisement of a response to the GW 1. The advertisement information to be transmitted contains the chronological data and the device ID of the portable communication device 2.

In the GW 1, the advertisement receiver 21 receives the advertisements of the responses to the data transmission request. The data acquisition controller 13 determines whether the number of responses received by the advertisement receiver 12 is larger than the threshold N (8). The data acquisition controller 13 determines that the number of responses (8) is equal to or smaller than the threshold N (8). In short, the data acquisition controller 13 determines that the number of responses is within the allowable range. The data acquisition controller 13 then acquires the data of the portable communication devices 2 corresponding to the transmission request ID "2". The data acquisition controller 13 then extends the data transmission request area, increments the transmission request ID, and causes transmission of the data transmission request to a new area.

As described above, the data acquisition controller 13 extends the data transmission request area step by step, increments the transmission request ID, and causes transmission of a data transmission request to a new area. When the limit of the data transmission request area is reached, the data acquisition controller 13 requests the advertisement transmitter 11 to issue a notification indicating that the communication history is to be initialized.

As illustrated in FIG. 6B, in the GW 1, when the limit of the transmission area denoted by rn is reached, the data acquisition controller 13 requests the advertisement transmitter 11 to issue a resetting notification indicating that the communication history is to be initialized. The advertisement transmitter 11 sets, as a sending-out field strength of advertisements of the transmission request, a sending-out field strength that corresponds to the transmission area rn and that is requested by the data acquisition controller 13.

The advertisement transmitter 11 then transmits advertisements of the resetting notification to the portable communication devices 2. The resetting notification contains advertisement information where the transmission request ID is "END" that means completion of the acquisition. Alternatively, for example, the resetting notification may contain advertisement information that means completion of acquisition that is, for example, a character string, such as "FINISH" or a numerical value that is recognized differently from the transmission request ID (when the minimum value of the transmission request ID is "1", "0" may be used). When it is possible to previously define the applicable maximum value of the transmission request ID, a value larger than the maximum value of the transmission request ID may be used as the advertisement information that means completion of the acquisition.

When the portable communication device 2 receives the resetting notification, the advertisement transmission controller 22 initializes the history of transmission request IDs (old IDs) that are stored in the data storage unit 23. The value of the old IDs to be initialized is, for example, 10000; however, the value is not limited to this. It is satisfactory if the value is larger than the value that is taken as the transmission request ID. The advertisement transmitter 25 does not reply to the resetting notification.

The GW 1 then starts acquiring the next chronological data from the narrowest area again.

Case where Portable Communication Device is not Able to Respond to Data Transmission Request When the number of responses is larger than the threshold, the GW 1 makes an adjustment to narrow the data transmission request area such that the number of responses is equal to or smaller than the threshold. When the portable communication device 2 responds to the data transmission request but then the area is narrowed and thus the portable communication device 2 is outside the area, the GW 1 may be not able to respond to the data transmission request that is re-transmitted. The case will be described below.

Figure 7:
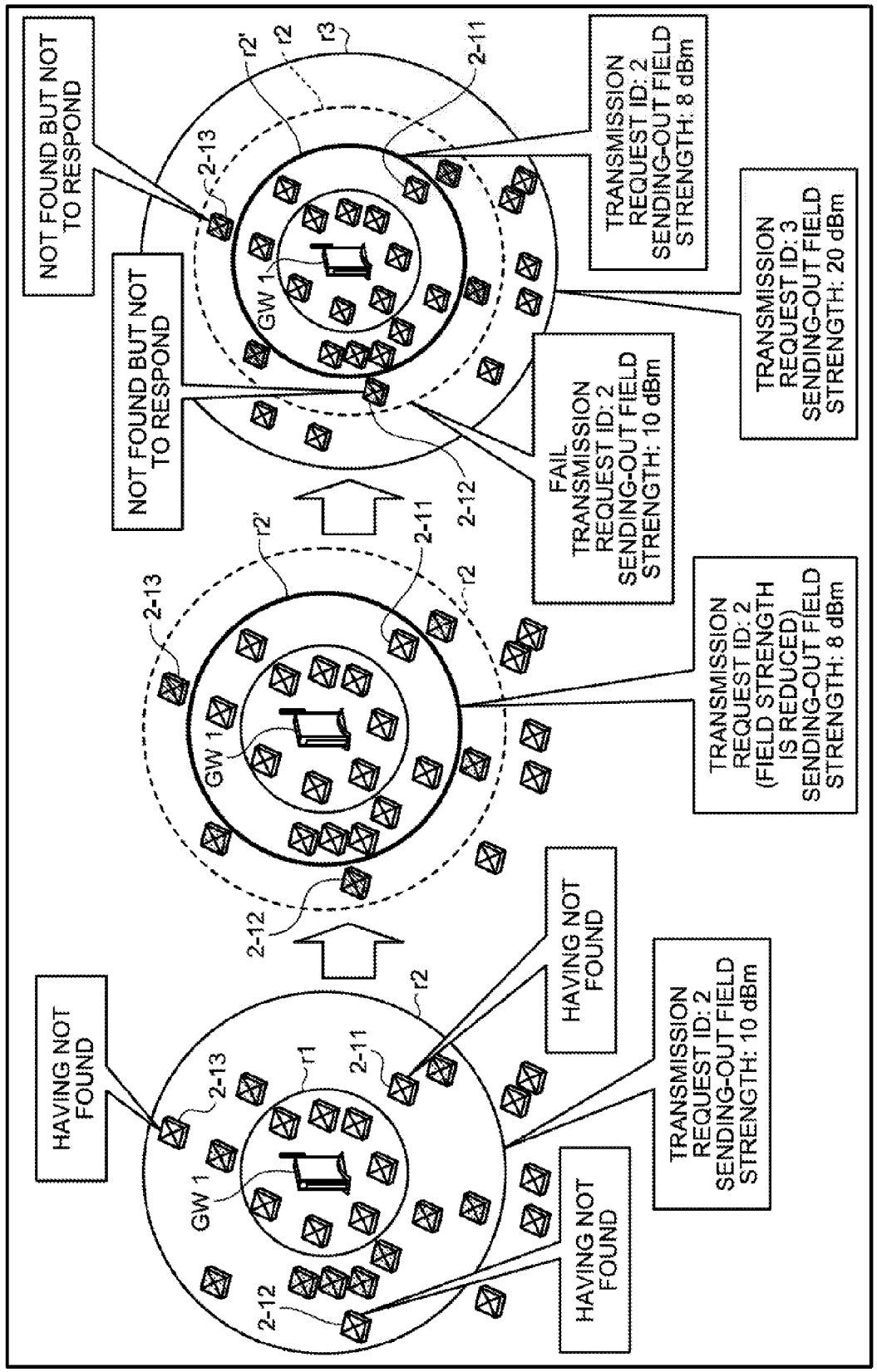
FIG. 7 is a diagram illustrating a case where it is not possible to respond to a data transmission request according to the first embodiment.

FIG. 7 is a diagram illustrating the case where it is not possible to respond to the data transmission request according to the first embodiment. First of all, the GW 1 sets an advertisement sending-out field strength of the GW 1 at 10 dBm. As illustrated on the left in FIG. 7, the portable communication device 2 receives, from the GW 1, the data transmission request containing advertisement information of "2" as the transmission request ID. Each of the potable communication devices 2 within the area r2 then transmits a response to the data transmission request; however, the number of responses is larger than the threshold and thus The GW 1 is not able to find the responses of the excess of the portable communication devices 2 over the threshold. The responses of the portable communication devices 2-11 to 2-13 are not found here.

As illustrated in FIG. 7, the number of responses is larger than the threshold and thus the GW 1 narrows the area (reduces the field strength to 8 dBm) and re-transmits the data transmission request. The advertisement information contained in the re-transmitted request contains "2" as the transmission request ID. Each of the portable communication devices 2 within the area r2' that is narrower than r2 transmits a response to the data transmission request. The number of responses is equal to or smaller than the threshold and accordingly the GW 1 is able to find the responses of the portable communication devices 2 within the area r2'. The portable communication device 2-11 responds to the re-transmitted request and is found by the GW 1. The portable communication devices 2-12 and 2-13 are outside the area r2' and thus do not respond to the re-transmitted request.

As illustrated on the right in FIG. 7, the GW 1 extends the area (increases the field strength to 20 dBm) and transmits a data transmission request. The advertisement information contained in the re-transmitted request contains "3" as the transmission request ID. Then, when the portable communication devices 2 within an area r3 have not responded to the request, each of the portable communication devices 2 transmits a response to the data transmission request. The portable communication devices 2-12 and 2-13 do not respond to the data transmission request as the transmission request ID "3" is larger than the transmission request ID (old ID) "2" to which a response has been made, i.e., as the portable communication devices 2-12 and 2-13 have already made responses. Accordingly, the sets of data of the portable communication devices 2-12 and 2-13 are not delivered to the GW 1. In other words, the portable communication devices 2-12 and 2-13 have responded to the data transmission request but, when the area is narrowed and thus the portable communication devices 2-12 and 2-13 are outside the area, the portable communication devices 2-12 and 2-13 are not able to respond to the data transmission request that is re-transmitted.

When the portable communication device 2 is located near the boundary on receiving the advertisement of the data transmission request, the advertisement transmission controller 22 does not respond to the transmission request. In other words, the portable communication devices 2 located near the boundary do not respond to the transmission request and respond to the next transmission request. This is to prevent the responses of the portable communication devices 2 located in the area from being undelivered to the GW 1. For example, the advertisement transmission controller 22 sets a threshold of the receiving filed strength for determining whether the portable communication device 2 is near the boundary. The advertisement transmission controller 22 measures the field strength on reception of the advertisement information of the data transmission request and, when the field strength is equal to or smaller than the given value, determines that the portable communication device 2 is located near the boundary of the area. When the receiving field strength is equal to or smaller than the given value, the advertisement transmission controller 22 does not transmit any response to the data transmission request.

Figure 8:
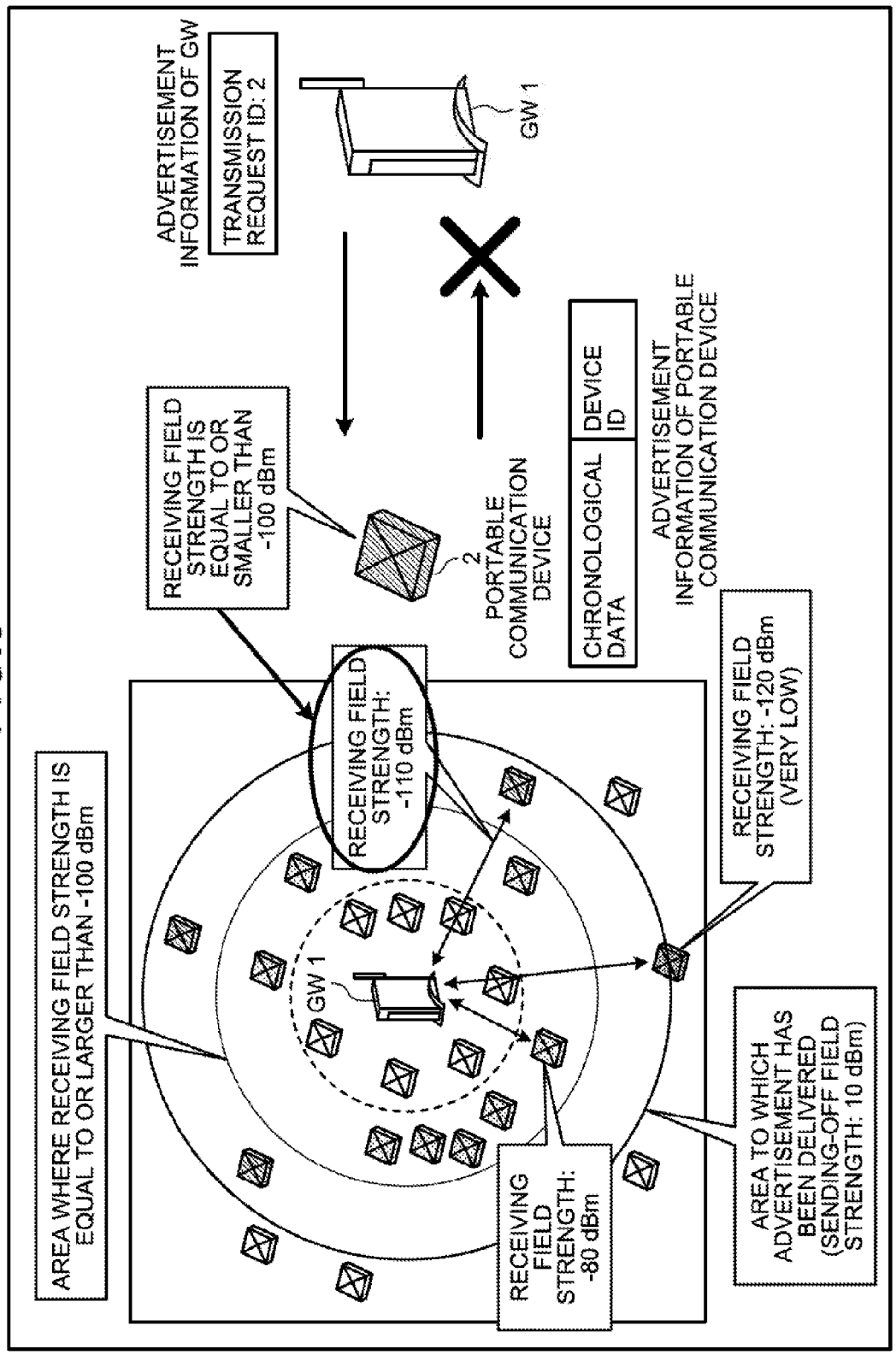
FIG. 8 is a diagram of an exemplary advertisement transmission control process performed by a portable communication device according to the first embodiment.

Exemplary Advertisement Transmission Control Process Performed by Portable Communication Device FIG. 8 is a diagram of an exemplary advertisement transmission control process performed by the portable communication device according to the first embodiment. As illustrated in FIG. 8, in the portable communication device, the advertisement receiver 21 receives, from the GW 1, a data transmission request containing advertisement information of "2" as the transmission request ID. When the field strength on reception of the advertisement information of the data transmission request (receiving filed strength) is equal to or smaller than the given value, the advertisement transmission controller 22 does not transmit any response to the data transmission request. This is because the advertisement transmission controller 22 determines that the portable communication device 2 is located near the boundary. Here, the receiving field strength is "−110 dBm". When the given value is −110 dBm, the receiving field strength is equal to or smaller than −110 dBm and thus the advertisement transmission controller 22 does not transmit any response to the data transmission request.

Exemplary Sequence of Information Processing System

Figure 9:
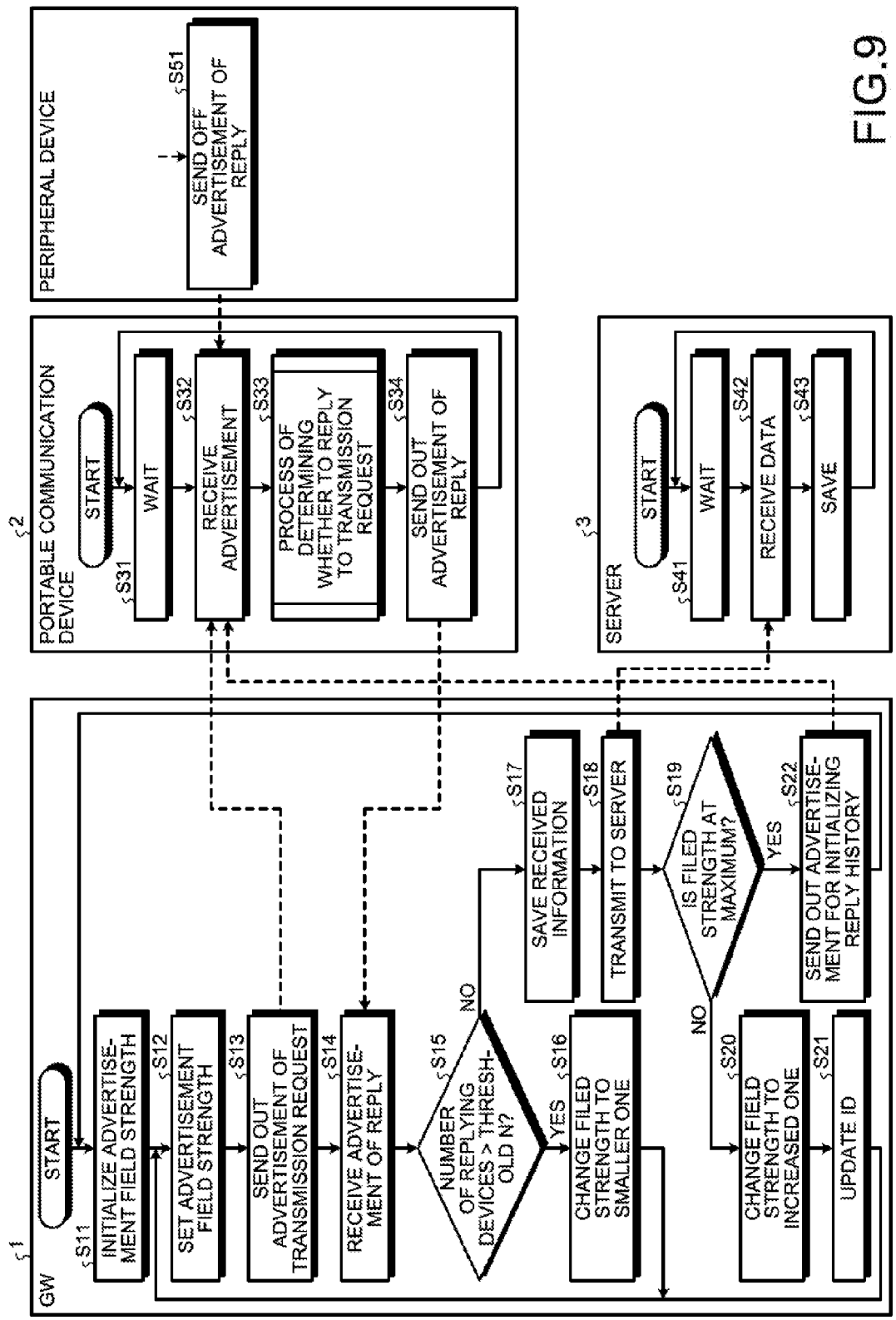
FIG. 9 is a diagram of an exemplary sequence of an information processing system according to the first embodiment.

FIG. 9 is a diagram of an exemplary sequence of the information processing system according to the first embodiment.

As illustrated in FIG. 9, the GW 1 initializes the advertisement sending-out field strength (step S11). The GW 1 sets an advertisement sending-out field strength (step S12). The GW 1 sends out advertisements of a data transmission request (step S13). A transmission request ID is set in the advertisement information contained in the transmission request.

The GW 1 receives advertisements of replies (responses) (step S14). In short, the GW 1 receives advertisement information from the portable communication device 2. Chronological data and a device ID are set in the received advertisement information. The GW 1 determines whether the number of replying devices is larger than the threshold N (step S15). On determining that the number of replying devices is larger than the threshold N (YES at step S15), the GW 1 changes the sending-out field strength to a smaller one (step S16). The GW 1 then moves to step S12 to re-transmit a data transmission request.

On determining that the number of devices is equal to or smaller than the threshold N (NO at step S15), the GW 1 saves the received advertisement information (step S17). The GW 1 transmits the saved advertisement information to the server 3 (step S18).

The GW 1 determines whether the sending-out field strength is at the maximum (step S19). On determining that the sending-out field strength is not at the maximum (NO at step S19), the GW 1 changes the sending-out field strength to an increased one (step S20). The GW 1 then updates the transmission request ID (step S21). For example, the GW 1 increments the transmission request ID. The GW 1 then moves to step S12 in order to transmit a data transmission request.

On the other hand, on determining that the sending-out field strength is at the maximum (YES at step S19), the GW 1 sends out advertisements for initializing the reply history (step S22). In other words, when the limit of the data transmission area is reached, the GW 1 transmits a notification indicating that the communication history is to be initialized. The GW 1 then moves to step S11 in order to initialize the sending-out field strength. In short, the GW 1 adjusts the data transmission request area to the narrowest area again and sends out advertisements of a data transmission request.

The portable communication device 2 waits until it receives an advertisement (step S31). The portable communication device 2 receives an advertisement (step S32). The portable communication device 2 receives an advertisement that is transmitted from the GW 1 (step S13) and receives an advertisement that is transmitted from one of peripheral devices including other portable communication devices 2 (step S51).

The portable communication device 2 then performs a process of determining whether to reply (respond) to the data transmission request (step S33). The flowchart of the determination process will be described below. To reply to the data transmission request, the portable communication device 2 sends out an advertisement of a reply (response) to the data transmission request (step S34). Chronological data and a device ID are set in the advertisement information contained in the reply. The portable communication device 2 then moves to step S31.

The server 3 waits until it receives data (step S41). The server 3 receives data (step S42). The server 3 saves the received data (step S43). For example, the server 3 receives and saves the advertisement information that is transmitted from the GW 1. The server 3 moves to step S41.

Flowchart Containing Advertisement Transmission Control Process Performed by Portable Communication Device 2

Figure 10:
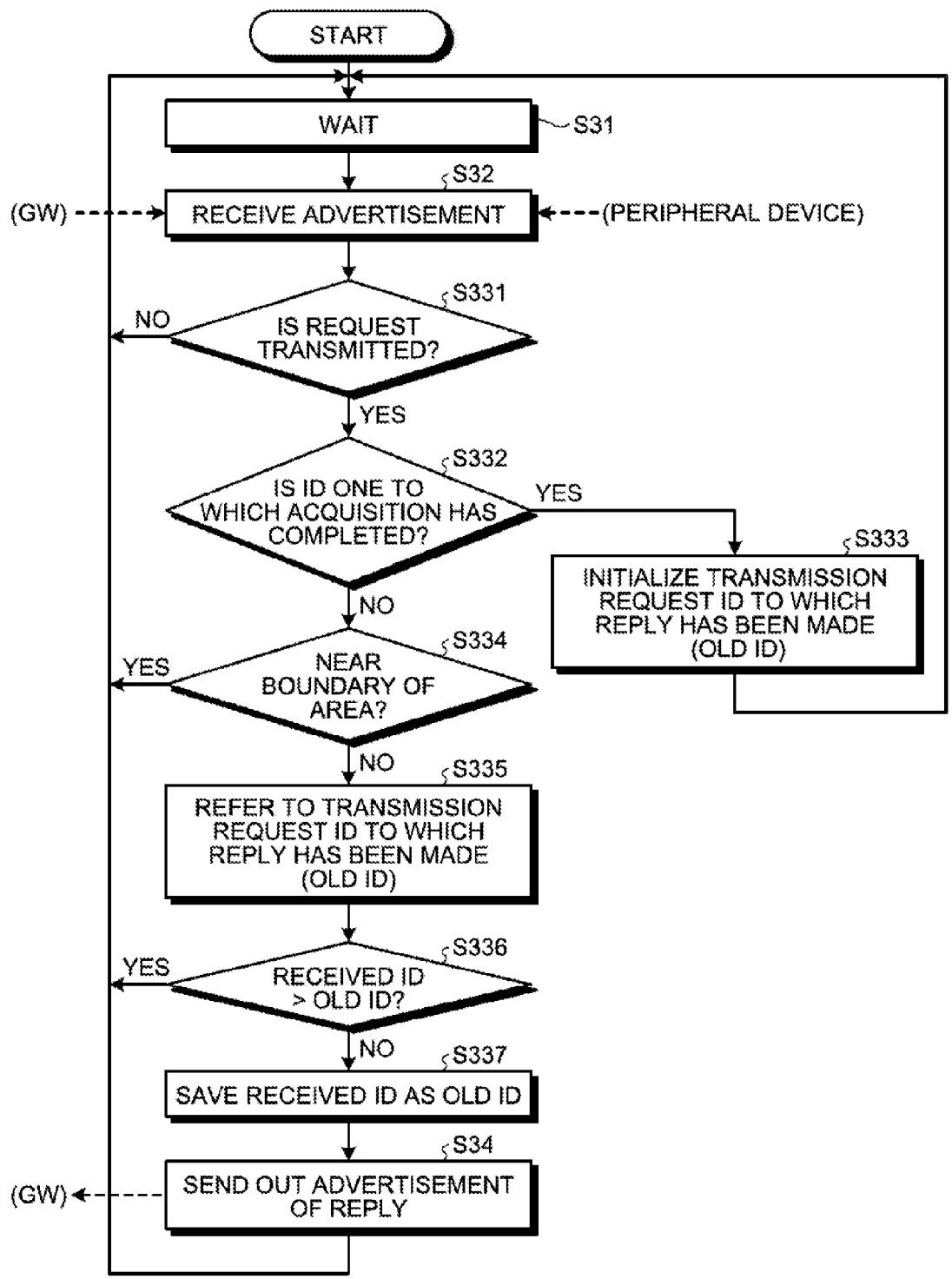
FIG. 10 is a diagram of an exemplary flowchart including an advertisement transmission control process performed by the portable communication device according to the first embodiment.

FIG. 10 is a diagram of an exemplary flowchart containing an advertisement transmission control process performed by the portable communication device according to the first embodiment. The same processes in the flowchart illustrated in FIG. 10 as those of the portable communication device 2 illustrated in FIG. 9 are denoted with the same reference numerals as those in FIG. 9.

As illustrated in FIG. 10, the portable communication device 2 waits until it receives an advertisement (step S31). The portable communication device 2 receives an advertisement (step S32).

The portable communication device 2 then determines whether the advertisement is of a data transmission request (step S331). On determining that the advertisement is not of a data transmission request (NO at step S331), the portable communication device 2 moves to step S31 in order to wait until it receives the next advertisement.

On the other hand, on determining that the advertisement is of a data transmission request (YES at step S331), the portable communication device 2 determines whether the transmission request ID is an acquisition completion ID (step S332). For example, the portable communication device 2 determines whether the transmission request ID is "END" that means completion of the acquisition.

On determining that the transmission request ID is an acquisition completion ID (YES at step S332), the portable communication device 2 initializes the transmission request ID (old ID) to which the portable communication device 2 has already replied (step S333). The portable communication device 2 then moves to step S31 in order to wait until it receives the next advertisement.

On the other hand, on determining that the transmission request ID is not an acquisition completion ID (NO at step S332), the portable communication device 2 determines whether it is near the boundary of the area (step S334). For example, the portable communication device 2 determines whether the field strength on reception of the data transmission request is equal to or smaller than the given value.

On determining that the portable communication device 2 is near the boundary of the area (YES at step S334), the portable communication device 2 moves to step S31 in order to wait until it receives the next advertisement. On the other hand, on determining that the portable communication device 2 is not near the boundary of the area (NO at step S334), the portable communication device 2 refers to the transmission request ID (old ID) to which the portable communication device 2 has already replied (step S335).

The portable communication device 2 then determines whether the transmission request ID (received ID) contained in the received advertisement information is larger than the transmission request ID (old ID) to which the portable communication device 2 has already replied (step S336). On determining that the received ID is larger than the old ID (YES at step S336), the portable communication device 2 determines that it has already made a reply (response) to the ID and moves to step S31 in order to wait until it receives the next advertisement.

On the other hand, on determining that the received ID is equal to or smaller than the old ID (NO at step S336), the portable communication device 2 saves the received ID as an old ID in the data storage unit 23 (step S337). The portable communication device 2 then sends out an advertisement of a reply (response) (step S34). Chronological data and the device ID are set in the advertisement information contained in the reply. The portable communication device 2 then moves to step S31 in order to wait until it receives the next advertisement.

Effect of First Embodiment

As described above, in the first embodiment, the GW 1 transmits a data transmission request to unspecified and many portable communication devices 2 that are located in a given area. The GW 1 receives responses to the data transmission request from the portable communication devices 2. When the number of received responses is larger than the maximum allowable number to the GW 1, the GW 1 adjusts the data transmission request area such that the number of responses is equal to or smaller than the maximum allowable number. When the number of received responses is equal to or smaller than the maximum allowable number to the GW 1, the GW 1 adjusts the area to which the data transmission request is transmitted, which is an area different from the area to which the data transmission request has been already transmitted. This configuration enables the GW 1 to adjust the data transmission request area in a stepwise manner and thus acquire sets of data equal/larger in number to/than the maximum allowable number to the GW 1.

In the first embodiment, the GW 1 limits the data transmission request area when the number of responses is larger than the maximum allowable number to the GW 1. The GW 1 then re-transmits a data transmission request to unspecified and many portable communication devices 2 located in the limited area. This configuration enables the GW 1 to acquire data from the communication devices that are located in the limited area.

According to the first embodiment, when the number of responses is equal to or smaller than the maximum allowable number to the GW 1, the GW 1 changes the area or direction of the limited data transmission request area. The GW 1 then transmits a data transmission request to unspecified and many communication devices that are located in the changed limited area. This configuration enables the GW 1 to acquire data from new portable communication devices that are located in the changed area and accordingly acquire sets of information equal/larger in number to/than the maximum allowable number from the portable communication devices 2 in a stepwise manner.

In the first embodiment, the portable communication device 2 determines whether it is located near the boundary of the data transmission request area. On determining that the portable communication device 2 is located near the boundary of the data transmission request area, the portable communication device 2 does not respond to the data transmission request and responds to the next data transmission request. This configuration makes it possible to prevent the portable communication device 2 from intending to make a response, i.e., from failing in making a response, although the portable communication device 2 is not able to determine whether the response has been/has not been delivered to the GW 1 safely.

[b] Second Embodiment

In the first embodiment, when the portable communication device 2 is located near the boundary on receiving an advertisement of a data transmission request, the advertisement transmission controller 22 does not respond to the transmission request and responds to the next transmission request; however, the advertisement transmission controller 22 is not limited to this. When the portable communication device 2 is located near the boundary on receiving an advertisement of a data transmission request, the advertisement transmission controller 22 may respond to the transmission request and may be forced to respond to the next transmission request.

A case where, when the portable communication device 2 is located near the boundary on receiving an advertisement of a data transmission request, the advertisement transmission controller 22 responds to the transmission request and is forced to respond to the next transmission request will be described as the second embodiment.

Figure 11:
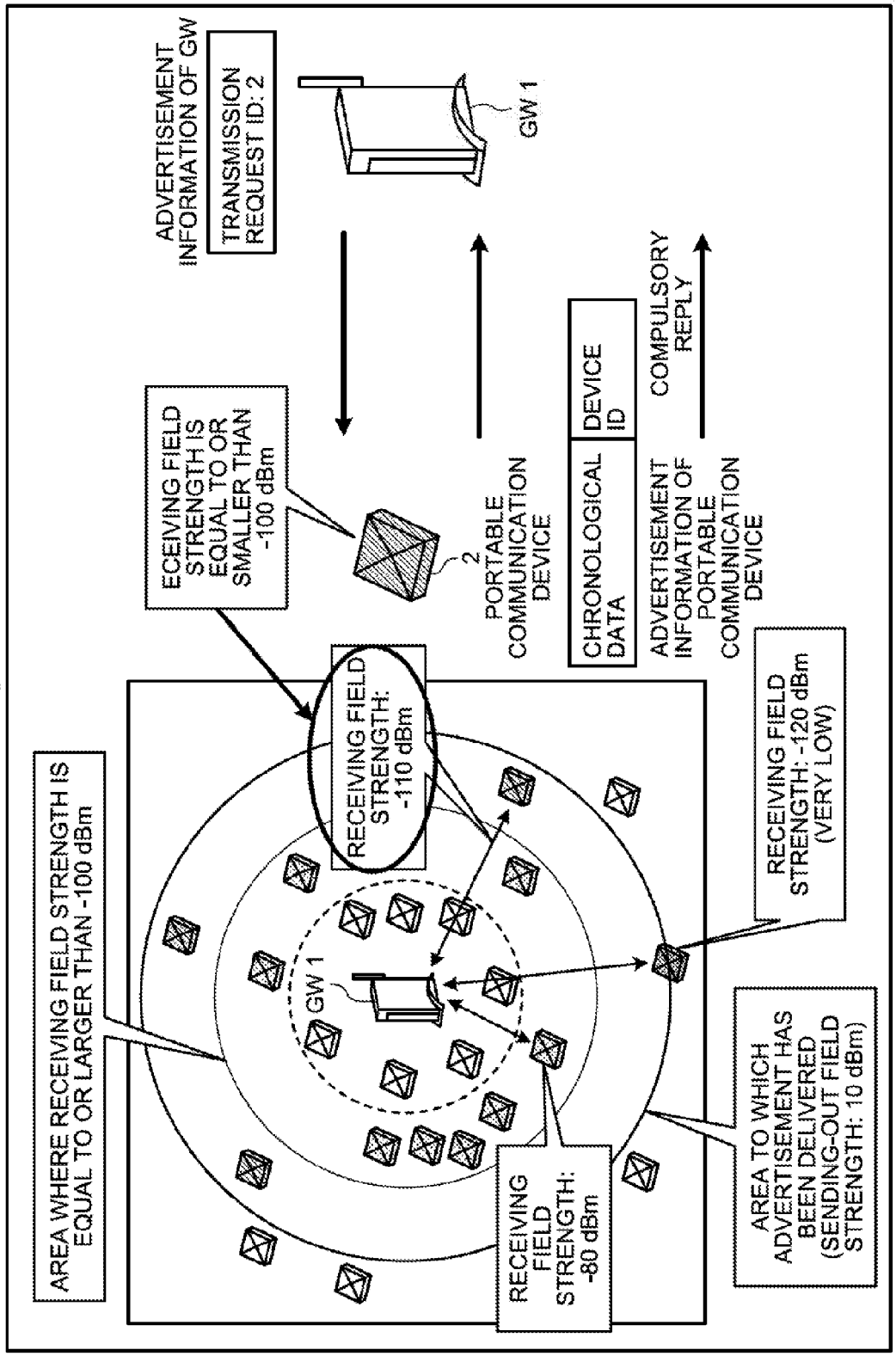
FIG. 11 is a diagram of an exemplary advertisement transmission control process performed by a portable communication device according to a second embodiment.

Exemplary Advertisement Transmission Control Process Performed by Portable Communication Device FIG. 11 is a diagram of an exemplary advertisement transmission control process performed by the portable communication device according to the second embodiment. As illustrated in FIG. 11, in the portable communication device, the advertisement receiver 21 receives, from the GW 1, a data transmission request containing advertisement information of "2" as the transmission request ID. The advertisement transmission controller 22 sends out an advertisement of a response to the data transmission request. When the field strength (receiving field strength) on reception of the data transmission request is equal to or smaller than a given value, the advertisement transmission controller 22 sets a compulsory reply mode on and is forced to reply to the next transmission request. Here, the receiving field strength is "−110 dBm". When the given value is −110 dBm, the receiving field strength is equal to or smaller than −110 dBm and thus the advertisement transmission controller 22 sends out an advertisement of a response to the data transmission request and is also forced to reply to the next communication request.

Flowchart Containing Advertisement Transmission Control Process Performed by Portable Communication Device 2

FIG. 12 is a diagram of an exemplary flowchart containing the advertisement transmission control process performed by the portable communication device according to the second embodiment. The same processes in the flowchart illustrated in FIG. 12 as those in the descriptions of the advertisement transmission control process illustrated in FIG. 10 will be denoted with the same reference numbers in FIG. 10.

As illustrated in FIG. 12, the portable communication device 2 waits until it receives an advertisement (step S31). The portable communication device 2 receives and advertisement (step S32).

The portable communication device 2 then determines whether the advertisement is of a data transmission request (step S331). On determining that the advertisement is not of a data transmission request (NO at step S331), the portable communication device 2 moves to step S31 in order to wait until it receives the next advertisement.

On the other hand, on determining that the advertisement is of a data transmission request (YES at step S331), the portable communication device 2 determines whether the transmission request ID is an acquisition completion ID (step S332). For example, the portable communication device 2 determines whether the transmission request ID is "END" that means completion of the acquisition.

On determining that the transmission request ID is an acquisition completion ID (YES at step S332), the portable communication device 2 initializes the transmission request ID (old ID) to which the portable communication device 2 has already replied (step S333). The portable communication device 2 then moves to step S31 in order to wait until it receives the next advertisement.

On the other hand, on determining that the transmission request ID is not an acquisition completion ID (NO at step S332), the portable communication device 2 determines whether the compulsory reply mode is on (step S61). On determining that the compulsory reply mode is on (YES at step S61), the portable communication device 2 moves to step S337 so as to be forced to send out an advertisement of a reply (response).

On the other hand, on determining that the compulsory reply mode is not on (NO at step S61), the portable communication device 2 refers to the transmission request ID (old ID) to which the portable communication device 2 has already replied (step S335).

The portable communication device 2 determines whether the transmission request ID (received ID) contained in the received advertisement information is larger than the transmission request ID to which the portable communication device 2 has already replied (step S336). On determining that the received ID is larger than the old ID (YES at step S336), the portable communication device 2 determines that it has already made a reply (response) and moves to step S31 in order to wait until it receives the next advertisement.

On the other hand, on determining that the received ID is equal to or smaller than the old ID (NO at step S336), the portable communication device 2 saves the received ID as an old ID in the data storage unit 23 (step S337). The portable communication device 2 then sends out an advertisement of a reply (response) (step S34). Chronological data and the device ID are set in the advertisement information contained in the reply.

The portable communication device 2 then determines whether it is near the boundary of the area (step S62). For example, the portable communication device 2 determines whether the field strength on reception of a data transmission request is equal to or smaller than a given value.

On determining that the portable communication device 2 is near the boundary of the area (YES at step S62), the portable communication device 2 sets the compulsory reply mode on (step S63). The portable communication device 2 moves to step S31 to wait until it receives the next advertisement.

On the other hand, on determining that the portable communication device 2 is not near the boundary of the area (NO at step S62), the portable communication device 2 sets the compulsory reply mode off (step S64). The portable communication device 2 then moves to step S31 in order to wait until it receives the next advertisement.

Effect of Second Embodiment

As described above, in the second embodiment, the portable communication device 2 determines whether it is located near the boundary of the data transmission request area. On determining that the portable communication device 2 is located near the boundary of the data transmission request area, the portable communication device 2 responds to the data transmission request and is also forced to respond to the next data transmission request. This configuration makes it possible to prevent the portable communication device 2 from intending to make a response, i.e., from failing in making a response, although the portable communication device 2 is not able to determine whether the response has been/has not been delivered to the GW 1 safely.

[c] Other Embodiments

The case where the information processing system 9 includes the single GW 1 has been described as the first and second embodiments; however, the information processing system 9 is not limited to this. The information processing system 9 may include multiple GWs 1.

The case where the information processing system 9 includes multiple GWs 1 will be described with reference to FIG. 13. FIG. 13 is a diagram of an exemplary case where the information processing system 9 includes multiple GWs. As illustrated in FIG. 13, a GW $1_A$, a GW $1_B$ and a GW $1_C$ are set in the information processing system 9. Each of the GWs 1 transmits advertisements of a data transmission request. It suffices if the advertisement information contains a transmission request ID and further includes the ID of the GW. The ID of the GW is contained in order for the portable communication device 2 that receives an advertisement of a data transmission request to determine which one of GWs 1 is the GW 1 that transmitted the transmission request to which the portable communication device 2 has replied (responded). Accordingly, even when the portable communication device 2 moves, the GW 1 corresponding to the location to which the portable communication device 2 moves acquires the data of the portable communication device 2 that moves and thus the GW 1 is able to acquire the data of the portable communication devices 2 over the wide area.

In the first and second embodiments, when the number of responses is larger than the allowable number to the GW 1, the GW 1 limits the area to which the transmission request is issued such that the number of the portable communication devices 2 that makes responses decreases, thereby adjusting the transmission request area. Limiting the transmission request area performed by the GW 1 according to the first and second embodiments has been described as narrowing the area. Alternatively, the GW 1 may change the direction in which a transmission request is transmitted.

Figure 14A:
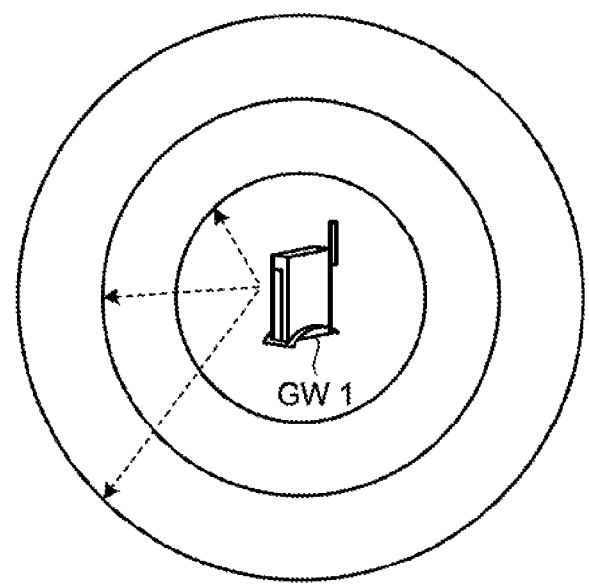
FIG. 14A is Diagram (1) of a method of adjusting a transmission request area performed by the GW.
Figure 14B:
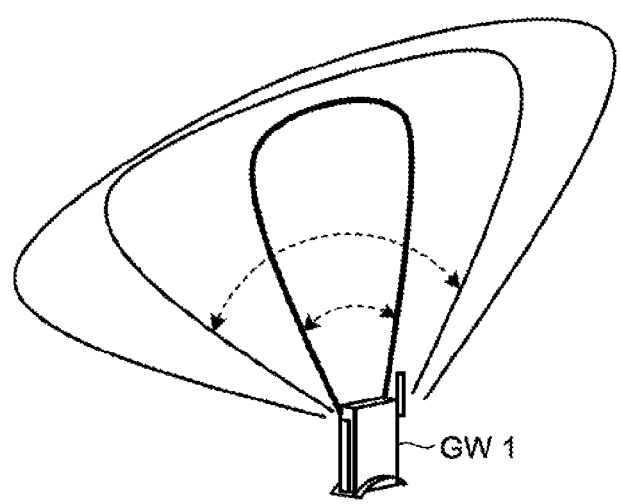
FIG. 14B is Diagram (2) of a method of adjusting the transmission request area performed by the GW.
Figure 14C:
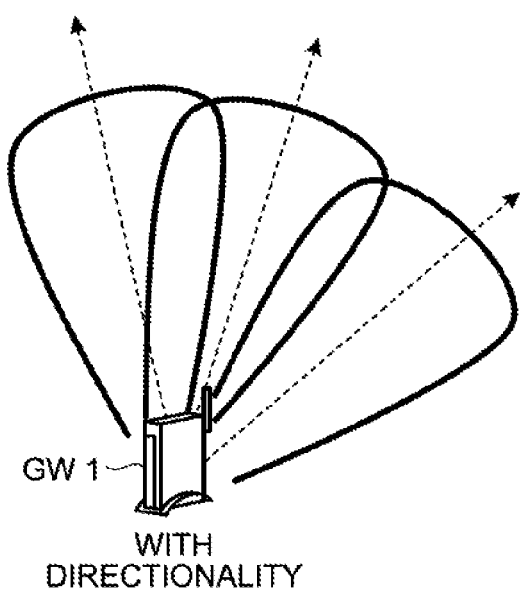
FIG. 14C is Diagram (3) of a method of adjusting the transmission request area performed by the GW.

Methods of adjusting the transmission request area performed by the GW 1 will be described below with reference to FIGS. 14A to 14C. FIGS. 14A to 14C are diagrams of exemplary methods of adjusting the transmission request area performed by the GW.

FIG. 14A illustrates a method of adjusting the transmission request area, where the transmission request area is limited by narrowing the transmission request area. The parameter used to adjust the area is, for example, the sending-out field strength. In other words, the GW 1 adjusts the transmission request area according to the sending-out field concentrically. In other words, the GW 1 reduces the sending-out field strength to narrow the concentric area and increases the sending-out field strength to extend the concentric area. The adjusting method illustrated in FIG. 14A is the same as those illustrated in FIGS. 1 and 2.

FIG. 14B illustrates a method of adjusting the transmission request area, where the transmission request area is limited by narrowing the transmission request area. The parameter used to adjust the area is, for example, the angle of the sending-out field. In other words, the GW 1 adjusts the transmission request area with directionality according to the angle of the sending-out field. In other words, the GW 1 reduces the angle of the sending-out field to narrow the transmission request area and increases the angle of the sending-out field to increase the transmission request area.

FIG. 14C illustrates a method of adjusting the transmission request area, where the transmission request area is limited to the direction in which the transmission request is transmitted. The parameter used to adjust the area is, for example, the direction of the field. In other words, the GW 1 adjusts the transmission request area with directionality according to the direction of the sending-out field. In other words, the GW 1 takes the direction of the sending-out field as a first direction to limit the transmission request area and takes the direction of the ending-out field as a second direction to limit the transmission request area.

In the first and second embodiments, the advertisement transmitter 11 transmits advertisements of data transmission requests. The frequency of transmission of an advertisement of a transmission request may be changed, for example, according to the subject who carries the portable communication device 2. The subject is, for example, a person, a vehicle, or a train. Furthermore, when the subject is a person, for example, the frequency may be changed according to whether the person is walking or running. When the subject is a vehicle or a train, the frequency may be changed according to whether the vehicle or the train is stopped, is driven slowly, or is driven normally. In other words, it suffices if the frequency of transmitting an advertisement of a transmission request may be determined according the maximum moving speed of the subject.

The components of the devices illustrated in the drawings need not necessarily be physically configured as illustrated in the drawings. In other words, the specific modes of dispersion and integration of the devices are not limited to those illustrated in the drawings. The entire of part of the devices may be configured according to various loads or the environment in which the devices are used by functionally or physically dispersing or integrating them according to any unit. For example, the data acquisition controller 13 may be separated into a controller that performs control according to the number of responses and a controller that controls resetting notification. The advertisement transmission controller 22 may be separated into a controller that determines whether to respond to a data transmission request and a controller that performs resetting control on receiving a resetting notification. Furthermore, the advertisement transmitter 25 and the advertisement receiver 21 of the portable communication device 2 may be integrated. The advertisement receiver 12 and the advertisement transmitter 11 of the GW 1 may be integrated. The data storage unit 14 may be connected as an external device of the GW 1 via a network.

It is possible to implement the above-described various processes of the embodiments by executing a program that is prepared in advance with a computer, such as a personal computer or a work station. An exemplary computer that executes an information processing program that implements the same functions as those of the GW 1 illustrated in FIG. 1 will be described below. FIG. 15 is a diagram of the exemplary computer that executes the information processing program.

As illustrated in FIG. 15, a computer 200 includes a CPU 203 that executes various arithmetic operations, an input device 215 that receives data inputs from a user, and a display controller 207 that controls a display device 209. The computer 200 includes a drive device 213 that reads, for example, a program from a storage medium and a communication controller 217 that transmits and receives data to and from other computers via a network. The computer 200 further includes a memory 201 that temporarily stores various types of information and a HDD 205. The memory 201, the CPU 203, the HDD 205, the display controller 207, the drive device 213, the input device 215, and the communication controller 217 are connected with one another via a bus 219.

The drive device 213 is a device for, for example, a removable disk 211.

The CPU 203 reads an information processing program 205a, loads the information processing program 205a into the memory 201, and executes the information processing program 205a as a process. The process corresponds to each functional unit of the GW 1. Information processing information 205b corresponds to the advertisement transmitter 11, the advertisement receiver 12, the data acquisition controller 13, the data storage unit 14, and the data transmitter 15 of the GW 1. For example, the removable disk 211 stores each type of information, such as the information processing program 205a.

The information processing program 205a need not necessarily be stored in the HDD 205 in the first place. For example, the information processing program 205a may be stored in a "portable physical medium" that is inserted into the computer 200, such as a flexible disk (FD), a CD-ROM, a DVD disk, a magneto-optical disk or an IC card. The computer 200 may read the information processing program 205a from the portable physical medium and execute the information processing program 205a.

According to a mode, even when there are unspecified and many communication devices, the information processing device is able to acquire an excess of sets of data of information processing devices over the maximum allowable number of sets of data to be received.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
unspecified many communication devices; and
an information processing device that acquires sets of information of the respective unspecified many communication devices,
wherein
the information processing device includes
a transmitter that transmits, to a communication device that is located within a given area, a request to transmit information of the communication device;
a receiver that receives a response to the request to transmit the information from the communication device that is located within the given area; and
an adjuster that, when the number of responses that are received by the receiver is larger than a maximum allowable number to the information processing device, adjusts an area to which the request to transmit the information is transmitted such that the number of responses is equal to or smaller than the maximum allowable number and that, when the number of responses is equal to or smaller than the maximum allowable number to the information processing device, adjusts the area to which the request to transmit the information is transmitted, which is the area different from the area to which the request has been transmitted.

2. The information processing system according to claim 1, wherein
when the number of responses is larger than the maximum allowable number to the information processing device, the adjuster limits the area to which the request to transmit the information is transmitted, and
the transmitter re-transmits the request to transit information to the unspecified many communication devices that are located in the limited area.

3. The information processing system according to claim 2, wherein
when the number of responses is equal to or smaller than the maximum allowable number to the information processing device, the adjuster changes any one of the area and direction of the limited area to which the request to transmit the information is transmitted, and
the transmitter transmits, to the unspecified many communication devices that are located in the limited area, the request to transmit the information.

4. The information processing system according to claim 3, wherein
the communication device includes
a receiver that receives, from the information processing device, the request to transmit the information;
a determination unit that, on the basis of the request to transmit the information that is received by the receiver, determines whether the communication device is located near a boundary of the area to which the request to transmit the information is transmitted; and
a responding unit that, when the determination unit determines that the communication device is located near the boundary of the area to which the request to transmit the information is transmitted, does not respond to the request to transmit the information and responds to the next request to transmit the information.

5. The information processing system according to claim 4, wherein
when the determination unit determines that the communication device is located near the boundary of the area to which the request to transmit the information is transmitted, the responding unit responds to the request to transmit the information and is forced to respond to the next request to transmit the information.

6. An information processing device comprising:
a processor, wherein the processor executes:
transmitting, to unspecified many communication devices that are located within a given area, a request to transmit information of each communication device;
receiving a response to the request to transmit the information from a communication device that is located within the given area; and
adjusting, when the number of responses that are received by the receiver is larger than a maximum allowable number, an area to which the request to transmit the information is transmitted such that the number of responses is equal to or smaller than the maximum allowable number and adjusting, when the number of responses is equal to or smaller than the maximum allowable number, the area to which the request to transmit the information is transmitted, which is the area different from the area to which the request has been transmitted.

7. A prioritizing method executed by a computer, the method comprising:

transmitting, to unspecified many communication devices that are located within a given area, a request to transmit information of each communication device using a processor;

receiving a response to the request to transmit the information from a communication device that is located within the given area using the processor; and when the number of responses that are received is larger than a maximum allowable number, adjusting an area to which the request to transmit the information is transmitted such that the number of responses is equal to or smaller than the maximum allowable number and, when the number of responses is equal to or smaller than the maximum allowable number, adjusting the area to which the request to transmit the information is transmitted, which is the area different from the area to which the request has been transmitted using the processor.

* * * * *